United States Patent [19]

Fukino et al.

[11] 4,329,040
[45] May 11, 1982

[54] SIGNAL TRANSMITTING DEVICE OF AN INTERMEDIATE LENS BARREL OF A CAMERA

[75] Inventors: Kunihiro Fukino, Kawasaki; Sunao Ishizaka, Tokyo, both of Japan

[73] Assignee: Nippon Kogaku K.K., Tokyo, Japan

[21] Appl. No.: 242,887

[22] Filed: Mar. 12, 1981

[30] Foreign Application Priority Data

Mar. 19, 1980 [JP] Japan .................................. 55-33922

[51] Int. Cl.³ .............................................. G03B 17/14
[52] U.S. Cl. ..................................... 354/286; 354/46; 354/270
[58] Field of Search ................. 354/286, 46, 295, 197, 354/270, 271, 191; 350/257, 252

[56] References Cited

U.S. PATENT DOCUMENTS 3,683,765  8/1972  Iura ......................................... 354/46
4,003,068  1/1977  Hashimoto et al. ................. 354/286

Primary Examiner—John Gonzales

Attorney, Agent, or Firm—Fitzpatrick, Cella, Harper & Scinto

[57] ABSTRACT

In an intermediate lens barrel mountable between an interchangeable lens having on the mount thereof means for generating a minimum F-number signal and a camera having means for detecting the signal on the mount thereof on which the interchangeable lens is mountable and including a circuit for receiving as inputs the detected signal and an output based on the light passed through the interchangeable lens and effecting an exposure operation, there is provided means capable of being coupled to each of the signal generating means and the detecting means during said mounting. The transmitting means includes correcting means for shifting the signal obtained from the signal generating means by an amount corresponding to the difference of the minimum F-number obtained as the result of the coupling of the interchangeable lens and the intermediate lens barrel from the minimum F-number of the interchangeable lens and transmitting the signal to the detecting means.

5 Claims, 2 Drawing Figures

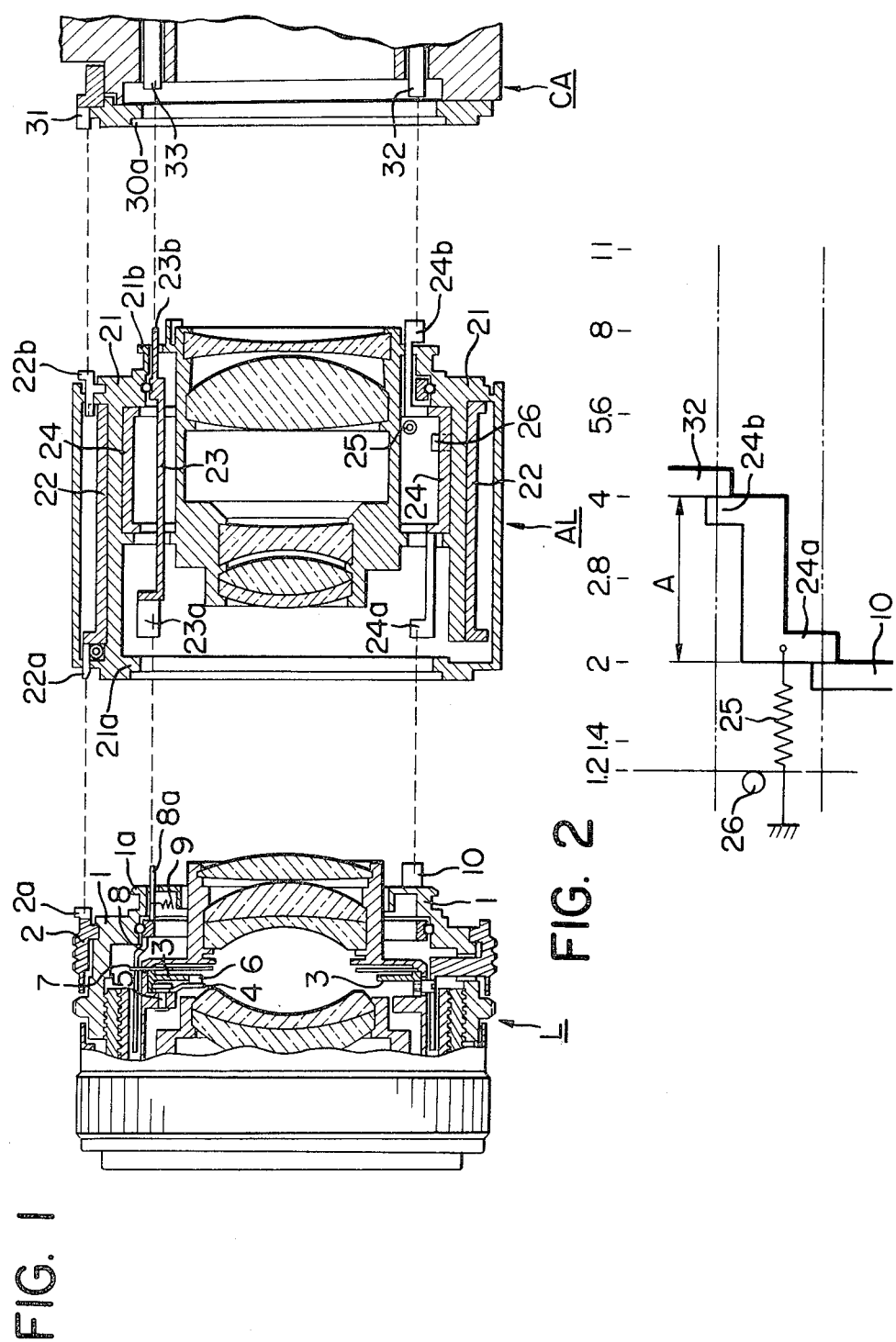

SIGNAL TRANSMITTING DEVICE OF AN INTERMEDIATE LENS BARREL OF A CAMERA

BACKGROUND OF THE INVENTION

1. Field of the Invention

This invention relates to a signal transmitting device of an intermediate lens barrel mounted between a camera and an interchangeable lens.

2. Description of the Prior Art

As an accessory device for changing the focal length of an interchangeable lens, for example, from f=50 mm to f=100 mm, there is already known an auxiliary lens such as a rear conversion lens of the type which is mounted between the interchangeable lens and a camera body. When such a rear conversion lens is used, the minimum F-number of the interchangeable lens as a whole including the conversion lens is increased in accordance with the variation in focal length.

Such variation in minimum F-number is caused not only by a change in the focal length of the entire lens system but also by a variation in effective aperture resulting from the mounting of the auxiliary lens. That is, when the effective aperture is decreased by mounting of the auxiliary lens, the minimum F-number of the entire lens system is increased. Further, when a close-up ring or a bellows device or the like is mounted between the interchangeable lens and the camera, the effective F-number is also varied with a variation in image distance.

On the other hand, there is already known an interchangeable lens having on the mount thereof means for generating an F-number signal during open aperture. This F-number signal is applied to and processed by the exposure meter, the shutter speed priority automatic exposure control device or the program automatic exposure control device of a camera. When the aforementioned interchangeable lens and the intermediate lens barrel are mounted on a camera provided with these devices, malfunction would be caused unless the minimum F-number signal of the interchangeable lens is corrected by an amount of variation in F-number and transmitted to these devices of the camera.

For example, where shutter speed priority automatic exposure control photography is to be effected, if a corrected minimum F-number is transmitted to the camera, the display of the effective minimum F-number or the actually controlled F-number within the viewfinder will be wrong. Also, where program control photography wherein the combination of a shutter speed and an aperture value is selected and controlled in accordance with a predetermined program for a variation in object brightness is to be effected, if an uncorrected minimum F-number is transmitted to the camera, there will not be obtained a shutter speed and an aperture value in a prearranged combination. When an intermediate lens barrel has been mounted, both the weight and length of the entire interchangeable lens system are increased and therefore, in the case of photography, the shutter speed should preferably be controlled to a high speed to reduce the influence of a hand vibration or the like, but the combination of a shutter speed and an aperture value obtained in the absence of the aforementioned correction becomes a combination in which the shutter speed is controlled to a lower speed than a prearranged one, and this is particularly not preferable.

Also, where photography is to be effected with a flashlight unit capable of automatic flash output control mounted on such a camera, if photography is carried out with the above-described substantial aperture value transmitted to the flashlight unit, a proper exposure may be directly obtained.

When the minimum F-number of the interchangeable lens is intactly transmitted to the camera with the intermediate lens barrel mounted thereon, it will become necessary to make correction by the use of an ASA dial or the like by an amount of variation in quantity of light occurring when the intermediate lens barrel has been mounted. Accordingly, when intermediate lens barrels having different amounts of variation in quantity of light are alternately used, correction must be made each time, and, when a camera is used with an interchangeable lens alone mounted thereon, the correction must be put back into its original state, and this renders the operation very complex and may cause mistakes in use.

Such inconveniences may also occur when exposure operation or display is effected with the minimum F-number signal of the phototaking lens introduced into the camera.

SUMMARY OF THE INVENTION

It is an object of the present invention to provide an intermediate lens barrel which transmits the minimum F-number signal of an interchangeable lens to a camera and which enables the signal to be corrected for any variation in minimum F-number.

The intermediate lens barrel of the present invention is capable of being coupled, when mounted between an interchangeable lens having on the mount thereof means for generating an F-number signal during open aperture and a camera having means for detecting the signal, to each of the signal generating means and the detecting means, and includes signal transmitting means for shifting the signal obtained from the signal generating means by an amount corresponding to the difference of the minimum F-number obtained as the result of the coupling of the interchangeable lens and the intermediate lens barrel from the minimum F-number of the interchangeable lens and transmitting the signal to the detecting means.

The present invention is applicable not only to an auxiliary lens such as the aforementioned rear conversion lens, but also to an intermediate ring such as a close-up ring, a bellows device or the like.

The invention will become more fully apparent from the following detailed description thereof taken in conjunction with the accompanying drawings.

BRIEF DESCRIPTION OF THE DRAWINGS

FIG. 1 is a cross-sectional view of an embodiment of the present invention and showing the relations among a phototaking lens, an auxiliary lens and a camera body.

FIG. 2 illustrates the operation of the device according to the embodiment of the present invention.

DESCRIPTION OF THE PREFERRED EMBODIMENTS

The invention will hereinafter be described with respect to an embodiment thereof in which it is applied to an auxiliary lens.

Referring to FIG. 1, an interchangeable lens L has a male bayonet mount 1a integral with a fixed barrel 1, a preset aperture ring 2 rotatably supported on the fixed barrel 1, a first signal member 2a secured to the preset aperture ring 2 and generating, as a circumferential position change, aperture step number information (hereinafter referred to as the step number signal) corresponding to the difference between the minimum F-number and the preset aperture value of the interchangeable lens L, and a second signal member 10 secured to the bayonet mount 1a and generating a minimum F-number signal corresponding to the minimum F-number of the interchangeable lens as an amount of bias in the circumferential direction from a reference position on the mount. The interchangeable lens L further has a diaphragm driving ring 7 rotatable about the optical axis and driving a diaphragm blade by a conventional mechanism, a conventional aperture setting mechanism for limiting the amount of rotation of the diaphragm driving ring 7, said aperture setting mechanism including a lever 4 having secured thereto a pin 6 contacting a cam surface formed in the inner periphery of a cam ring 3 rotatable with the aperture ring 2, said lever 4 being rotatably mounted on a shaft 5, and an automatic stop-down lever 8 provided for rotation with the diaphragm driving ring 7 to rotate the ring 7 in response to the shutter release operation of the camera body during photography.

An auxiliary lens AL is a rear conversion lens and has a lens group for changing the focal length of the interchangeable lens L to two times, three times, etc., a female bayonet mount 21a provided integrally with a base 21 and capable of being coupled to the mount 1a of the interchangeable lens L, a male bayonet mount 21b provided integrally with the base 21, a first transmitting member 22 rotatably supported on the base 21 and introducing any position change (i.e., rotation angle) of the first signal member 2a by a terminal 22a and putting it out as the same position change to a terminal 22b, a second transmitting member 24 rotatably supported on the base 21 and detecting any position change (i.e., amount of circumferential displacement) of the second signal member 10 of the interchangeable lens by a terminal 24a and putting it out as the same position change to a terminal 24b, and an interlocking member 23 rotatably supported on the base 21 and engageable with the end 8a of the automatic stop-down lever 8 by means of a terminal 23a. The second transmitting member 24 is normally biased in circumferential direction by a spring 25 and is limited in its range of rotation by a stopper pin 26.

The camera body CA has a female bayonet mount 30a capable of being coupled to the bayonet mount 1a or 21b, a first detecting member 31 engaged with the first signal member 2a or the output terminal 22b of the first transmitting member 22 and introducing the step number signal in response to the rotation thereof, a second detecting member 32 engaged with the second signal member 10 or the output terminal 24b of the second transmitting member 24 and detecting a positional signal provided thereby, and a diaphragm driving member 33 engaged with the end 8a of the automatic stop-down lever or the terminal 23b of the interlocking member 23 and operable in a direction to stop down the diaphragm blade during shutter release operation.

The auxiliary lens AL is coupled to the camera body by the bayonet mount 21b, and the interchangeable lens L is coupled to the auxiliary lens AL by the bayonet mount 1a. Due to the presence of the auxiliary lens AL between the interchangeable lens L and the camera body, the minimum F-number (effective minimum F-number) of the entire lens system comprising the combination of the interchangeable lens L and the auxiliary lens AL becomes different from the minimum F-number of the interchangeable lens L alone. To correct this difference, the second transmitting member 24 of the auxiliary lens AL is formed as shown in FIG. 2.

FIG. 2 conceptually shows the circumferential relation among the second signal member 10 of the interchangeable lens, the second transmitting member 24 of the auxiliary lens and the second detecting member 32 of the camera body, shown in FIG. 1.

The surface of the input terminal 24a of the second transmitting member 24 which contacts the signal member 10 and the surface of the output terminal 24b of the second transmitting member 24 which contacts the detecting member 32 are provided and shifted in circumferential direction by a length A. This amount of shift A corresponds to the decrease in effective minimum F-number resulting from the auxiliary lens AL being mounted between the phototaking lens and the camera body.

When the interchangeable lens L is bayonet-coupled to the auxiliary lens AL, the second signal member 10 is moved rightwardly as viewed in FIG. 2 (in circumferential direction as viewed in FIG. 1) by the relative rotation of a predetermined angle of the bayonet mounts 1a and 21a during that coupling, and is stopped at its shown position. The end 24a of the second transmitting member becomes engaged with the signal member 10 and therefore, the transmitting member 24 is moved (rotated) to its shown position against the biasing force of spring 25. As a result, when the auxiliary lens AL is mounted to the camera body, the output terminal 24b of the transmitting member 24 becomes engaged with the detecting member 32 of the camera body at a position to which it has been displaced by the increase in effective minimum F-number which results from the mounting of the auxiliary lens AL. Accordingly, the effective minimum F-number of the entire lens system comprising the combination of the interchangeable lens L and the auxiliary lens AL is transmitted to the camera body through the detecting member 32.

Now, assume that the minimum F-number of the interchangeable lens L is F2. A rear conversion lens for changing the focal length of the phototaking lens to two times is mounted as the auxiliary lens AL. In this case, the entire lens system becomes dark by 2 EV in exposure amount. The position of the output terminal 24b relative to the input terminal 24a is determined so that the amount of shift A of the transmitting member 24 of the auxiliary lens corresponds to 2 EV, namely, the detecting member 32 of the camera body is displaced to the position of F4 which is a position displaced by two steps from F2. In this manner, the effective minimum F-number (in this case, F4) of the entire lens system comprising the combination of the interchangeable lens L and the rear conversion lens is introduced into the camera body.

In interchangeable lenses having different minimum F-numbers, the position of the signal member 10 is deviated either leftwardly or rightwardly as viewed in FIG. 2, and a signal obtained by correcting this minimum F-number by two steps by the transmitting member of the rear conversion lens is transmitted to the camera body.

With an auxiliary lens AL of magnification 1.4, namely, a rear conversion lens which becomes dark by 1 EV in exposure amount, by designing the amount of shift of the transmitting member to A/2, a signal obtained by correcting the minimum F-number of the interchangeable lens L by one step can be transmitted to the camera body.

The operation in which photography is effected by the use of a camera having mounted thereon the above-described interchangeable lens L and auxiliary lens AL will now be exemplarily illustrated with respect to a case where shutter speed priority automatic aperture control photography is effected under open photometry. When such photography is to be effected, the aperture ring 2 is first set to its minimum diaphragm aperture position so that the aperture setting mechanism including the cam ring 3 and the pin 6 does not limit the rotation of the diaphragm driving ring 7.

A desired shutter speed is then set as by a shutter dial (not shown). The light from an object to be photographed is directed through the interchangeable lens L and the auxiliary lens AL to a light-receiving element (not shown) within the camera body, from which the object brightness information (Bv) is obtained. An exposure control circuit, not shown, within the camera body operates the difference (Av-AVo) between an aperture value (Av) for obtaining a proper exposure and the effective minimum F-number (Avo) on the basis of the set shutter speed (Tv), the object brightness information (Bv), the effective minimum F-number (Avo) obtained by way of the displacement of the detecting member 32, and the set film speed (Sv). A display circuit (not shown) displays within the viewfinder the substantial aperture value of the entire lens system comprising the combination of the interchangeable lens and the auxiliary lens AL when the aperture is stopped down.

When shutter release is effected in this condition, the restraint of the interlocking member 23 by the diaphragm driving member 33 is released and with the aid of the action of the spring 9, the interlocking member 23, the automatic stop-down lever 8 and the diaphragm driving ring 7 start rotating together. When the diaphragm blade is stopped down by an aperture step number corresponding to the aforementioned Av-Avo, the member 33 of the camera body again restrains the interlocking member 23, whereupon the member 23, the lever 8, the ring 7 and the diaphragm blade stop moving. Thereafter, when the shutter is opened, photography of a proper exposure may be accomplished.

In the present embodiment, as described above, when the auxiliary lens is used, the effective minimum F-number of the entire lens system comprising the combination of the interchangeable lens and the auxiliary lens is introduced into the camera body and therefore, of course, proper exposure control can be achieved in the case of shutter speed priority aperture control photography and the effective minimum F-number of the entire lens system can be displayed within the viewfinder. Accordingly, the display becomes appropriate.

In contrast, where the auxiliary lens is used in shutter speed priority aperture control photography, if the minimum F-number of the interchangeable lens alone is intactly introduced into the camera body, proper exposure control may be achieved but the display within the viewfinder will display the minimum F-number of the interchangeable lens alone.

We claim:

1. In an intermediate lens barrel mountable between an interchangeable lens having on the mount thereof means for generating a minimum F-number signal and a camera having means for detecting said signal on the mount thereof on which said interchangeable lens is mountable and including a circuit for receiving as inputs said detected signal and an output based on the light passed through said interchangeable lens and effecting an exposure operation, the improvement comprising:

transmitting means capable of being coupled to each of said signal generating means and said detecting means during said mounting, said transmitting means including correcting means for shifting the signal obtained from said signal generating means by an amount corresponding to the difference of the minimum F-number obtained as the result of the coupling of said interchangeable lens and said intermediate lens barrel from the minimum F-number of said interchangeable lens and transmitting said signal to said detecting means.

2. An intermediate lens barrel according to claim 1, wherein said signal generating means of said interchangeable lens represents the minimum F-number signal as a position signal.

3. An intermediate lens barrel according to claim 2, wherein said detecting means of said camera includes a detecting member coupled to said signal generating means upon mounting of said interchangeable lens onto said camera and displaceable to a position represented by said position signal.

4. An intermediate lens barrel according to claim 3, wherein said signal generating means includes a signal member having an engaging portion at a position biased in circumferential direction by a predetermined amount from the reference position on the mount of said interchangeable lens, and said transmitting means includes a transmitting member having an input portion engageable with the engaging portion of said signal member and an output portion engageable with said detecting member, said transmitting member being displaceable in circumferential direction.

5. An intermediate lens barrel according to claim 4, wherein the input portion and the output portion of said transmitting member are provided at positions relatively biased in circumferential direction.

* * * * *

UNITED STATES PATENT AND TRADEMARK OFFICE
CERTIFICATE OF CORRECTION

PATENT NO. : 4,329,040

DATED : May 11, 1982

INVENTOR(S) : SACHIO OHMORI, ET AL.

It is certified that error appears in the above—identified patent and that said Letters Patent is hereby corrected as shown below:

In the Headnote, [75], before "Kunihior Fukino", insert --Sachio Ohmori, Yokohama,--; second line, change "both" to --all--.

Column 1, line 65, "not preferable" should be --undesirable--.

Signed and Sealed this

Third Day of August 1982

[SEAL]

Attest:

Attesting Officer

GERALD J. MOSSINGHOFF

Commissioner of Patents and Trademarks